Aug. 21, 1956  E. J. FERRY  2,759,579
COMBINED BRAKE AND POWER CONTROL
Filed Dec. 17, 1953  2 Sheets-Sheet 1
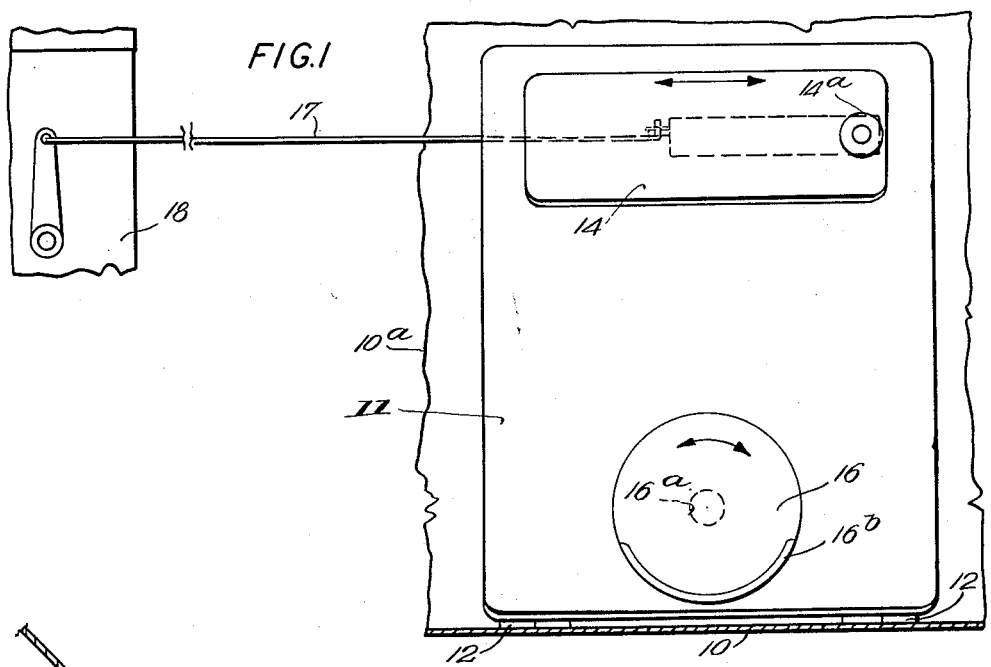
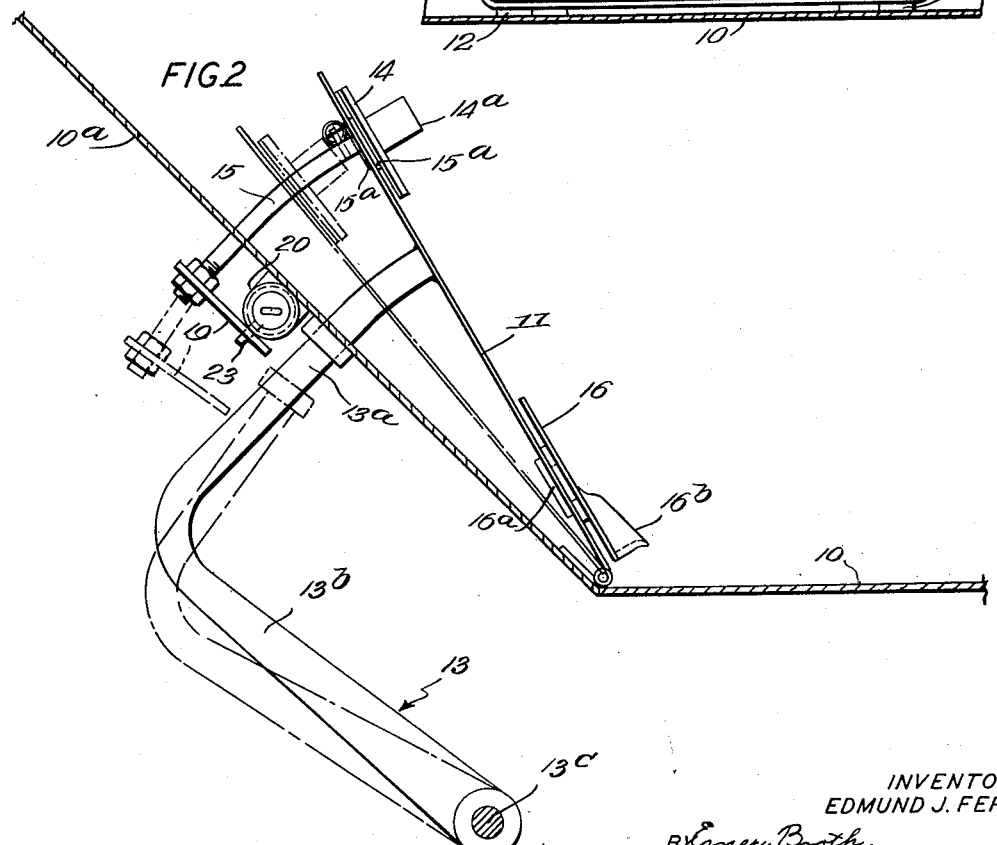
INVENTOR
EDMUND J. FERRY
ATT'YS.

Aug. 21, 1956 E. J. FERRY 2,759,579
COMBINED BRAKE AND POWER CONTROL
Filed Dec. 17, 1953 2 Sheets-Sheet 2

INVENTOR
EDMUND J. FERRY
BY Emery, Booth,
Townsend, Miller and Weidner
ATTYS.

United States Patent Office 2,759,579
Patented Aug. 21, 1956

2,759,579

COMBINED BRAKE AND POWER CONTROL

Edmund J. Ferry, West Roxbury, Mass.

Application December 17, 1953, Serial No. 398,730

1 Claim. (Cl. 192—3)

This invention relates generally to automotive mechanisms and more particularly to a combined brake and power control for vehicles. It aims primarily to make automotive vehicle operation safer, by promoting more rapid and certain application of the brake, and by rendering less likely the inadvertent misapplication of the power control. It aims further to make the control and manipulation of an automotive vehicle more comfortable and less tiresome, particularly under heavy and varying traffic conditions.

The invention will be better understood from a consideration of the following specification taken in conjunction with accompanying drawing in which:

Fig. 1 is a top plan of my novel control assembly, shown as installed in a vehicle;

Fig. 2 is a side view of the same;

Figure 3:
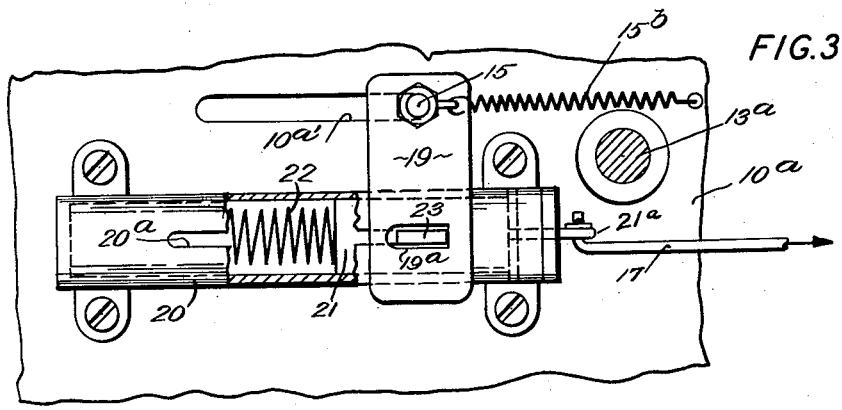
Figs. 3 to 5 are views taken from below and illustrating various operating conditions of the controls.

Automotive vehicles are conventionally provided with foot-operated brake and power controls which are laterally spaced along the floor of the vehicle, and arranged for actuation by depression from and for automatic or spring return to the non-operative elevated position. The operator's foot normally rests on and depresses the power control; manipulation of the brake control requires the release of the downward thrust on the power control, the lifting and shifting of the foot to the brake control, and a like downward thrusting of the same. It is generally appreciated that automotive vehicles are capable of traversing distances on the order of 40 to 50 feet in the fraction of a second required for this lifting and shifting of the foot and that it therefore constitutes a serious hazard of motor vehicle operation and highway travel. The requirement of repeated lifting and shifting of the foot is known also to be a source of driver fatigue, discomfort and distraction, particularly in heavy traffic, where the greatest concentration is required. The conventional brake-power control arrangement still further endangers motor vehicle operation in that in sudden emergencies the driver may inadvertently and involuntarily apply the manipulating or depressing force to the wrong control. The present invention will be seen novelly to reduce and eliminate these hazards and discomforts of motor vehicle operation and control.

Referring now to the drawings, and more particularly to Figs. 1 and 2, my novel brake and power control is there shown to be mounted on the vehicle floor 10 for at-rest placement of the driver's foot, and adjacent to and for support of certain of its parts from the inclined forward wall 10a. It comprises generally a plate or a pedal 11 having a width substantially greater than that of the driver's shoe, and supported by hinges 12, 12 mounted at and paralleling the juncture of the floor 10 and wall 10a, and by a lever 13, one arm 13a of which is seen to depend normally centrally of the pedal, and for reciprocation with the other arm 13b through said forward wall 10a and about pivot 13c. The crank 13 may be connected for manipulation of the brake and the control conditioned for automatic return of the pedal 11 to the upper or non-operative position by conventional means, not shown.

For application of vehicle power, I provide control means novelly constructed and arranged vertically at and for movement horizontally of the brake control just described. My novel accelerator, throttle, or power control comprises more particularly a plate or pedal 14 mounted above and for reciprocating movement laterally over the brake pedal 11, and fixed to a control rod 15, the latter projecting downwardly through pedal 11 and also through wall 10a, and supported for reciprocation or lateral shifting in pedal slot 11a by flanges 15a, 15a, oppositely engaging and slidable on plate 11. It will be appreciated that in operation the power control is thrust to the right, Fig. 1 (to the left as seen from below) and that said control is automatically returned to non-operative position by spring 15b, Fig. 3. It will be understood also that the described power control may consist of a pedal of a length and width adapted to receive and support the entire foot, or shoe; variously and as herein illustrated, it may comprise the lateral rectangular plate 14 overlying only a minor upper portion of the brake pedal, and associated therewith an annular plate 16 overlying centrally the lowermost portion of the brake pedal, this latter plate 16 pivoted, as at 16a, and optionally fitted with a heel rest, 16b. Control pedal 14 is seen further to have an upstanding knob, lug, or projection 14a at its right hand end, which projection is adapted for engagement by the driver's foot, thus rendering more certain the operation or manipulation of the power control. The lateral reciprocating movement of the pedal 14 is seen generally to be communicated through a control rod 17 and to a carburetor or the like 18, as schematically shown in Fig. 1.

Figure 4:
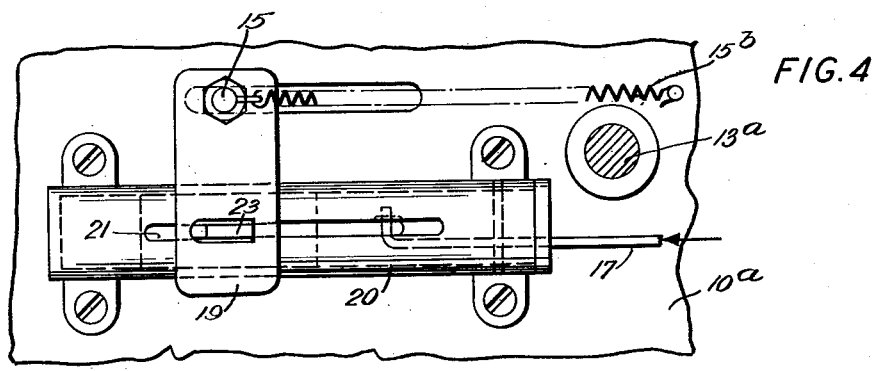
Figure 7:
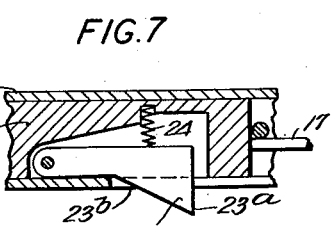
Fig. 7 is a vertical section taken along the line 7, 7 of Fig. 6.

My novel power control further comprises means for its disengaging or disconnecting automatically instantaneously upon manipulation of the brake pedal 11. As shown more particularly in Figs. 3 to 7 inclusive, said means comprise an arm or plate 19 supported at the base of control rod 15 for lateral projection beneath and generally paralleling wall 10a, and having a lateral recess 19a generally paralleling slot 10a, Fig. 3. Cooperating with the plate 19 is a casing or cylinder 20 supported from the under face of wall 11a and also overlying said plate, and housing a piston or plunger 21 sliding and urged to the left therein by a spring 22. Said plunger 21 carries a downwardly projecting detent 23 riding in longitudinal cylinder slot 20a and adapted to be received in recess 19a. This plate engaging detent 23 is seen to have a vertical or locking face 23a and an inclined or cam face 23b, and to be biased downwardly into the Fig. 7 position by a spring 24. Plunger 21 is provided further with an eye, hook, or the like means 21a by which it may be coupled to the turned over end of the connecting rod 17, Fig. 7. Application of vehicle power then, is seen to result from and require shifting of the piston 21 to the right (to the left, Figs. 3 to 5) against the force of a resilient means, which functions automatically yieldably to order it to the left hand, non-operative position, as just described.

The operation of my novel combined brake and power control will be readily appreciated by those skilled in the art. In the non-operative condition the control occupies the position illustrated by Figs. 1 and 3, and in solid line in Fig. 2, with the brake pedal 11 and power pedal 14 biased to the uppermost and leftmost positions respectively, and with the brake and power controls vertically displaced such that plunger detent 23 is received in aperture 19a of control rod arm 19. To increase power, as for gaining speed, the operator merely applies a lateral thrust against power pedal projection 14a sufficient to overcome the combined resistance of springs 15b, 22 and to force the pedal to the right, Fig. 4. This is seen normally to order the similar lateral shifting of the control rod 15, which carries with it the arm 19, the detent 23 and the piston 21, and through them the connecting rod 17, for desired manipulation of the carburetor or the like power influencing means 18. And to reduce power, the thrust against projection 14a is reduced, or released, the spring means 15a, 22 serving to restore the power control assembly to its non-operative Figs. 1 and 3 position.

Figure 5:
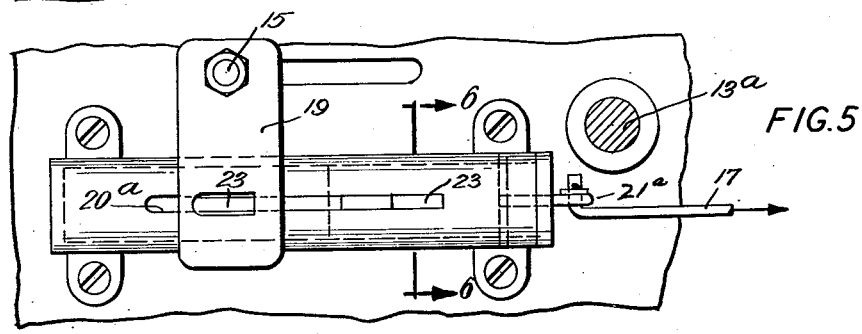
Figure 6:
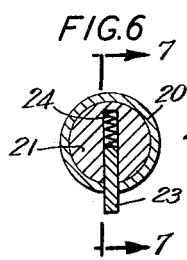
Fig. 6 is a section taken along the line 6, 6 of Fig. 5, with the parts shown right side up.

The operation of the brake control, and more particularly the application of the brake is seen merely to require depression of pedal 11. In accordance with the invention, this may be accomplished without lifting or removing the foot, as from heel supporting plate 16, and without shifting it from power-applying pedal 14. Referring now to Figs. 2 and 5, depression of the brake pedal 11 is seen to advance or depress the control rod 15 and its arm 19 relative to the wall 10a and from the solid to the dotted line position of Fig. 2, whereby detent 23 is withdrawn from the control arm aperture 19a, Fig. 5. This severing or disconnecting of the power control linkage frees spring 24 to drive piston 21 and connecting rod 17 to the left hand or non-operative position as already described. Upon release of the brake, and for reapplication of power, the operator is required first to let up on or release the mentioned thrust against the stop 14a, permitting the spring 15b to return the control rod 15 and arm 19 to the non-operative or Fig. 3 position, the detent 23 being first cammed into the piston recess and then returned or depressed by the spring 24 into operative position in the recess 19a.

From the foregoing it will be appreciated that with my novel combined control the manipulation of the vehicle brake and power systems may be accomplished from a single, at-rest position of the foot. My invention is seen further to assure safer operation of the vehicle by eliminating the shifting and lifting of the foot required by the conventional dual pedal control, and thus promoting more rapid and certain functioning of the said systems.

It will be appreciated also that I have provided for manipulation of the brake and power controls by different or vertical and lateral foot movement, thereby precluding inadvertent actuation of one control by the involuntary exercise of the control movement habitually associated with the other. Further and finally my invention will be seen to ease substantially the strain of driving, particularly in traffic, by providing for continuous support of the operator's foot in a single, at-rest position, and by providing a greater margin of safety flowing from a more rapid and certain manipulation of the brake and power controls in and from that position.

It will be understood that my invention, either as to means or method, is not limited to the exemplary embodiments herein illustrated or described, and I set forth its scope in my following claim.

I claim:

In combination, a brake control including a brake pedal supported normally in a non-operative position and for shifting vertically to an operative position, a power control including a connecting rod supported normally in a non-operative position, a control rod mounted vertically through said brake pedal, a power pedal carried by said control rod and overlying said brake pedal, said control rod and power pedal supported normally in a non-operative position and for shifting laterally to an operative position, and means for lateral thrust transmitting coupling of said control and connecting rods, said means engageable only in the non-operative position of said brake control and comprising a lateral arm on said control rod and a vertical detent on said connecting rod, said arm and detent intersecting in said non-operative position of the brake control and the detent being adapted to be cammed out of the plane of said arm, when said brake control is in said non-operative position, and by and permitting lateral return shifting of said control rod and power pedal from an operative to said normal non-operative position.

References Cited in the file of this patent

FOREIGN PATENTS

| | | |
|---|---|---|
| 183,359 | Switzerland | Mar. 31, 1936 |
| 476,770 | Great Britain | Dec. 15, 1937 |
| 783,181 | France | Apr. 1, 1935 |